US012760557B2

(12) United States Patent
Moeller

(10) Patent No.: US 12,760,557 B2
(45) Date of Patent: Oct. 13, 2026

(54) ENTRY DOOR FRAME REINFORCEMENT ASSEMBLY

(71) Applicant: David W. Moeller, Flowery Branch, GA (US)

(72) Inventor: David W. Moeller, Flowery Branch, GA (US)

(73) Assignee: EVERMARK, LLC., Suwanee, GA (US)

( * ) Notice: Subject to any disclaimer, the term of this patent is extended or adjusted under 35 U.S.C. 154(b) by 43 days.

(21) Appl. No.: 18/829,408

(22) Filed: Sep. 10, 2024

(65) Prior Publication Data

US 2026/0071462 A1 Mar. 12, 2026

(51) Int. Cl.
*E05B 15/02* (2006.01)

(52) U.S. Cl.
CPC ................................ *E05B 15/0205* (2013.01)

(58) Field of Classification Search
CPC .................................................. E05B 15/0205
See application file for complete search history.

(56) References Cited

U.S. PATENT DOCUMENTS

| | | | |
|---|---|---|---|
| 4,057,275 | A | 11/1977 | La Beaud |
| 4,171,836 | A | 10/1979 | St. Aubin |
| 4,174,862 | A | 11/1979 | Shane |
| 4,195,870 | A | 4/1980 | Percoco |
| 4,281,480 | A | 8/1981 | Wendt |
| 4,295,299 | A | 10/1981 | Nelson |
| 4,345,787 | A | 8/1982 | Dabrowski |
| 4,717,185 | A | 1/1988 | Hartley |
| 4,770,452 | A | 9/1988 | Petree, Jr. |
| 4,854,621 | A | 8/1989 | Baldwin |
| 4,862,658 | A | 9/1989 | Barker et al. |
| 4,865,370 | A | 9/1989 | Francis |
| 4,993,764 | A | 2/1991 | Barker |
| 5,127,690 | A | 7/1992 | Kim et al. |
| 5,154,461 | A | 10/1992 | Prescott et al. |
| D354,670 | S | 1/1995 | Simon et al. |

(Continued)

FOREIGN PATENT DOCUMENTS

| | | |
|---|---|---|
| DE | 202008005087 | 8/2008 |
| GB | 2523171 | 8/2015 |

OTHER PUBLICATIONS

International Searching Authority, "International Search Report" and "Written Opinion", PCT/US2025/043634, mailed on Dec. 18, 2025, 9 pages.

*Primary Examiner* — Mark A Williams
(74) *Attorney, Agent, or Firm* — Mathew L. Grell, Esq.; Grell & Watson Patent Attorneys LLC

(57) ABSTRACT

A door frame profile and reinforcement assembly to increase the resistance of an entry door and door frame to forced entry by an intruder. Increased resistance is achieved by either fitting and securing a U-shaped bar within a machined slot in the back of the door frame and attaching a shaped plate or plates that fits within the shaped bar or a rectangular bar and alternately shaped plates mounted directly on the back of the door frame which retains the door's throw bolt of the deadbolt and/or latch of the door lock. Optionally, with stronger door frames, the shaped plate alone may suffice, and the plate can be modified to a simple L-shaped form, a portion of which is inserted into a narrow groove which replaces the machined slot.

18 Claims, 13 Drawing Sheets

(56) References Cited

U.S. PATENT DOCUMENTS

| | | | | |
|---|---|---|---|---|
| 5,570,917 | A | 11/1996 | Cutrer | |
| 5,581,948 | A | 12/1996 | Simonsen | |
| 6,082,049 | A | 7/2000 | Hudson | |
| 6,834,897 | B1 * | 12/2004 | Walker | E05B 15/0205 292/340 |
| 7,165,793 | B2 | 1/2007 | Richmond et al. | |
| 7,467,818 | B2 * | 12/2008 | Young | E05B 63/10 49/504 |
| 8,887,457 | B1 * | 11/2014 | Knight | E06B 1/32 49/504 |
| 11,280,110 | B1 * | 3/2022 | Moeller | E05B 63/08 |
| 2007/0029823 | A1 * | 2/2007 | Gatrell | E05B 15/0205 292/340 |
| 2008/0202034 | A1 | 8/2008 | Campbell | |
| 2009/0077909 | A1 * | 3/2009 | Barthel | E06B 1/52 52/745.15 |
| 2010/0122502 | A1 | 5/2010 | Young | |
| 2010/0201138 | A1 * | 8/2010 | Sauder | E05B 15/0245 292/340 |
| 2012/0060423 | A1 * | 3/2012 | Fulton | E05B 15/02 49/460 |
| 2012/0181801 | A1 * | 7/2012 | Willis | E05B 15/0205 292/338 |
| 2013/0074414 | A1 * | 3/2013 | Jones | E05B 15/0205 49/504 |
| 2014/0346787 | A1 * | 11/2014 | Martin, Jr. | E05B 17/2003 292/289 |
| 2015/0013249 | A1 | 1/2015 | Nielsen et al. | |
| 2017/0058562 | A1 * | 3/2017 | Bunch | E05B 17/2084 |
| 2019/0271174 | A1 * | 9/2019 | Van Kampen | E05B 15/0205 |

* cited by examiner

ENTRY DOOR FRAME REINFORCEMENT ASSEMBLY

BACKGROUND OF THE INVENTION

1. Field of the Invention

The present invention relates to the field of door frames and, in particular, to a modified entry door frame profile and mating entry door strike frame reinforcement assembly that improves the ability of the strike frame and the door to resist forced entry.

2. Description of Relevant Art

Forced entry into residences and commercial buildings is, unfortunately, an all too common occurrence. Home invasions have occurred that have resulted in not only loss of property but also serious injuries and even death to the occupants. The ability of a typical residential front entry door and door frame to resist a forced entry is limited due to the small volume of wood or plastic composite (typically 0.75"×0.5"×1") that the throw bolt of the deadbolt has to retain it in the door frame. The thin stamped metal pieces mounted on the face of the frame that surround the deadbolt and latch in a typical entry door hardware system are more decorative than protective. As such, the need for improved resistance to forced entry is well known, and prior art exists that attempts to address this need.

Patents such as Blankenship, U.S. Pat. No. 4,858,384, Long, U.S. Pat. No. 5,566,509, Canerdy, Jr., U.S. Pat. No. 7,946,635 B2, Anderson, U.S. Pat. No. 8,132,832 B2, Jones, et. al. U.S. Pat. No. 8,938,915 B2 and others present door strike frame reinforcements in the form of a shaped metal strip with cutouts or punch outs for the throw bolt and latch. The shaped strip mounts onto the rabbeted face portion of an existing door strike frame, between the edge of the door containing the lock set and the face of the thinner part of the door frame, to reinforce it. The shaped strip is mounted with a number of long wood screws that secure the strip to the face of the door frame and potentially into the framing in the surrounding wall. The reinforcement does not require additional machining of the door frame but as a result the gap between the edge of the door and the door frame is reduced and could potentially interfere with the normal closure of the door. The strip would also be visible and would detract from the appearance of the door frame.

Patents such as Knight, U.S. Pat. No. 8,887,457 B1 and others describe systems that have significant sections of the door frame machined away and replaced by a shaped metal bar with openings for the latch and throw bolt. The bar is then secured through the remaining thickness of the door frame and into the framing in the surrounding wall. The machining required to prepare the door frame for installation of the bar is extensive and would be very difficult to perform without specialized templates or other purpose-built fixtures. As such, fitting this system to an existing door frame would be very difficult to accomplish at the location of a home using the typical hand tools available during home construction or carried by a contractor trying to fit the system to an existing home.

Patents and applications such as Young, U.S. Pat. No. 7,467,818 B2, Johnson, U.S. Pat. No. 2015/0252589 A1 and others describe systems that include shaped sheet metal pieces which are attached to be back of the door frame and wrap around the rabbeted edge of the door frame and over part of the face of the door frame in the area where the deadbolt is located. The sheet metal pieces are then secured with screws into the frame and/or the adjacent wall structure. The reinforcement requires little or no machining of the door frame, but as a result the gap between the edge of the door and the frame is reduced and could potentially interfere with the normal closure of the door. The sheet metal pieces would also be visible and would detract from the appearance of the door frame.

Patents such as Simpson, U.S. Pat. No. 5,934,024, Hudson, U.S. Pat. No. 6,082,049, Childress, U.S. Pat. No. 6,691,466 B1 and others describe systems that are mounted on the back face of the frame or are inserted into the edge or face of the rabbeted area of the frame in the area where the deadbolt is mounted. These systems all require some specialized machining of the door frame to be accomplished to allow them to be secured in a way that the system will mostly be hidden from view.

Patents such as Mayer, Jr., U.S. Pat. No. 6,178,700 B1, Olberding et. al., U.S. Pat. No. 7.134,246 B1 and others describe systems that are mounted between the back of the door frame and the surrounding wall structure. These systems are quite large in size, complex and would require the installer to accurately place and secure each component with numerous fasteners to mount them correctly.

In view of the foregoing disadvantages and limitations found in the prior art for the reinforcement of entry door frames, there is need for an improved method or system.

SUMMARY

The embodiments disclosed and claimed herein comprise components of reinforcement assemblies having various shapes and sizes which are designed and adapted for installation on the back of one leg, specifically the strike side leg, of a door frame assembly, whether during factory manufacture or field installation. They are all designed to improve the impact resistance of a door installed in the reinforced frames of various types, when impact force is applied to a door which is closed and locked with a latch and deadbolt to the reinforced strike side frame leg. Such impacts are typically applied to an area of the door adjacent to the frame leg during an attempted forced entry or similar event. Therefore, although the most basic embodiments comprise shaped plates as described below, preferably in combination with a U-shaped bar as also described, the claimed embodiments range from assemblies comprising one or two of such shaped plates up to complete reinforced door frames and pre-hung doors including such frames. Thus, much of the disclosure below (including examples) will necessarily concern the effects of the reinforced frames on the impact resistance of the door, lock and deadbolt when installed in such reinforced frames.

The purpose of the door frame profile and reinforcement assembly disclosed below is to improve the ability of the door and door frame entry system to resist the impact of an intruder attempting to force entry. Improved resistance to forced entry is achieved by providing a shaped plate attached to the back of the door frame that the throw bolt of the door deadbolt contacts or, preferably, two shaped plates so both the throw bolt and latch of the door lockset come in contact with the plates when the door is closed and the deadbolt and lock are in their locked position. The shaped plate or plates are then preferably secured to a shaped bar that is located in and secured within a shaped slot (rabbet) in the back of the door frame or simply secured directly within a shaped slot (rabbet) in the back of the door frame without the benefit of the shaped bar.

The improved entry door frame reinforcement assembly preferably comprises two main components. The first component is a U-shaped bar that seats into and is secured within a shaped slot in the back of the door frame that is oriented parallel to the length of the door frame. The second component is a shaped plate that attaches to the shaped bar and the back of the door frame and is oriented parallel to the back of the door frame in the location of the door lock and/or deadbolt to be reinforced. The system can utilize one or, preferably, two of the shaped plates so that the throw bolt of the deadbolt and latch of the door lock are both reinforced. The purpose of the U-shaped bar is to reinforce and better secure the shaped plate or plates if the door frame is constructed of a soft or low strength wood or composite. A set of threaded (or other mechanical) fasteners designed to securely connect the pieces to the back of the door frame directly and indirectly into the surrounding wall framing is also part of the assembly. The minimum length of a U-shaped bar that can secure two shaped plates needs to be greater than about 9" as the standard distances between the centerlines of the lock and deadbolt are either 5.5" or 6". The maximum length of the U-shaped bar is expected to be about 24", as testing has shown shorter bar lengths provide sufficient reinforcement. However, the true maximum length of the U-shaped bar could be as long as the actual frame leg, which is typically 81" to 97" in length.

The components of the above system can be cast, stamped, bent, formed, molded, machined or otherwise fabricated from metals or other materials that have sufficient structural strength to endure the loads placed on them during a forced entry attempt. For instance, sheet steel, including various alloys, brass, bronze and high strength polymeric composites can be used.

The shaped slot in the back of the door frame can be easily incorporated into the door frame when it is produced by either moulding (wooden door frame) or extrusion (plastic composite door frame). As the location of the slot is on the back of the door frame and does not alter the fit, form or function of the door frame, having this become the standard profile for door frames is feasible. The adoption of this as the standard profile would actually reduce the cost of manufacture for door frame producers as it would reduce the material content of extruded door frames and provide additional sawdust revenue for wood door frame producers. The machining required to cut the shaped slot into the back of an existing door frame can be accomplished with the use of a small table saw fitted with a dado saw blade set. As such, an existing strike frame leg could be modified to receive the security strike at a typical job site.

Door frames come in a range of widths (typically 4.5" to 12"), as they must match the overall thickness of the exterior wall construction used. The change in door frame width is accomplished by altering only the width of the thicker portion of the door frame as the thinner rabbeted portion is kept the same width to match the door thickness. As the location of the shaped slot is a set distance from the thin rabbeted edge of the door frame, changes in the overall width of the door frame have no impact on the fit of the security strike system, so one size of shaped plate and bar will work for a range of door frame widths.

The U-shaped bar is shaped to fit into and be secured within the shaped slot in the back of the door frame. The shaped bar has a cross-sectional shape and thickness resembling a broad U-shape or channel iron. When combined with the strength of the material chosen, the resulting combination will resist deformation or fracture due to being subjected to impact loading. The length of the shaped bar is sufficient, with enough fastening points, to spread the impact loads along enough length of the door frame to prevent the wooden or composite frame from failing and giving way, or to minimize the risk of such failure.

The shaped plate is shaped to fit within and be secured to the shaped bar and secured by fasteners into the door frame. The shaped plate is of a material and thickness sufficient to resist deformation or fracture due to impact loads. The shaped plate has an opening for the latch or throw bolt to pass through and the opening has a perpendicular rectangular flange that extends into the opening drilled into the door frame for the latch and/or throw bolt. This flange provides for more of the length of the latch or throw bolt to make contact with and be supported by the shaped plate. The shaped plate is also fitted with two slots that are located, oriented and sized so that wood screws of sufficient length can be driven through the rabbeted face of the door frame, pass through these slots and then into the wall framing that surrounds the door entry. The locations of the slots align with the area of the rabbet next to the slot cut to hold the weatherstrip so that the heads of the fasteners will be covered by the weatherstrip after it is installed, and thus the presence of these fasteners is hidden from view. As with the shaped bar, the length of the shaped plate(s) should be sufficient to spread impact loads along enough length of the door frame to minimize the risk of failure under impact.

Not all applications may require that the combination of the U-shaped bar and shaped plate be used to achieve the required resistance to forced entry (e.g., when the door frame is composed of quality hardwood as opposed to low grade softwood). For these applications, the shaped bar could be eliminated and the shaped plate secured directly into the shaped slot in the door frame. Another alternative is that the width of the shaped slot can be reduced and the portion of the shaped plate that fits within the shaped slot can be reduced to a simple flange and the locations of the fasteners for the shaped plate relocated.

At its simplest, an embodiment shown in FIG. 7 comprises a flat plate with a hole cut to coincide with the hole(s) in the door frame for the door latch and/or deadbolt, with a portion of the plate extending along the edge opposite this large hole bent approximately perpendicular to the plate's surface and adapted to be inserted into a narrow groove cut in the door frame to fit this portion. This simple version is suitable for use with door frames which are strong and durable due to the use of hardwood, thicker material, reinforcements or polymer composites. Longitudinal slots parallel to the plate's sides are provided to enable the plate to be positioned to coincide with the latch and/or deadbolt holes before installation with mechanical fasteners. Additional attachment holes are provided for securely attaching the plate to the door frame with mechanical fasteners.

The embodiment shown in FIG. 6 is a variation which is also designed for use with the strong door frames, but the shaped plate includes a double 90 degree bend on the edge opposite the latch hole which provides an offset portion perpendicular to the plate's surface and properly sized to permit a flat portion parallel to the plate's surface to fit within a wider rectangular groove cut to size in the door frame and to fit flush against the bottom of this groove, where it can be secured in place using a number of attachment holes and mechanical fasteners.

The embodiments shown can be added to reinforce an existing door and frame assembly by removing the existing door and entry frame, cutting the slot required in the back of the strike side frame leg, installing the shaped bar and plate(s) and reinstalling the now reinforced door and frame assembly. For existing doors that have been subject to forced entry damage, the embodiment and a replacement frame leg can be utilized to both repair and reinforce the existing door and frame assembly. The damaged door and frame assembly would be removed, the damaged/broken strike side frame leg removed, a new replacement leg with the machined slot and the embodiment mounted would be attached to complete the door and frame assembly and then the repaired and reinforced door and frame assembly reinstalled. Finally, a strike side frame leg with the machined slot and the embodiment attached can be utilized with a door and other frame components to produce a reinforced pre-hung door unit for use in new construction or when forced entry damage or other reasons prevent the existing door and frame assembly from being reused. Such a pre-hung door assembly would comprise a door frame comprising two legs, header and sill, with reinforcement assemblies for the latch and/or throw bolt installed in the latch-side leg and the door hung by hinges on the opposite leg.

The embodiment shown in FIG. 10 is an alternate design for use with an existing door and frame assembly that the user doesn't have the ability or desire to cut the required slot in the back of the door frame to fit the previous described embodiments. This alternate embodiment alters the prior shaped plate by mirroring the bends of the plate offset to produce an offset section that features a uniform narrow gap between the offset section of this alternate shaped plate and the back of the door frame. This uniform narrow gap between the alternate shaped plate and the back of the door frame will typically range from 1/32" to 1/8" and is sufficient to allow for a rectangular bar of a thickness matching the gap to be inserted between the alternate shaped plate and the back of the door frame. The rectangular bar is of sufficient width, in a preferred embodiment approximately 1/2" to 1 1/4" inch, and length, in a preferred embodiment approximately 10" to 18" inches, to allow for two of alternate shaped plates and the rectangular bar to be secured to the back of the door frame by a series of fasteners. Once secured the rectangular bar allows for the forces associated with an attempted forced entry of the door to be spread or dissipate over a sufficient length of the door frame to ensure the frame remains intact, and the forced entry is thwarted.

As a result, some known deficiencies of the current entry door frame reinforcing assemblies are addressed and overcome.

In an exemplary embodiment of an entry door frame reinforcement assembly for an entry door frame having a back, a lock/latch bore to receive a throw bolt, and a weatherstrip slot, including a reinforcement plate having a first edge and a second edge, the reinforcement plate having a lock/latch opening formed therethrough to receive the throw bolt and positioned proximate the first edge, the reinforcement plate adapted to be fastened to the back of the entry door frame with the lock/latch opening adjacent the lock/latch bore in the entry door frame, a plate offset section proximate the second edge of the reinforcement plate, the plate offset configured of two spaced apart opposing bends therein the reinforcement plate to form the plate offset section, the plate offset section having attachment holes positioned therethrough proximate the second edge, and an elongated bar having one or more connecting holes formed therethrough and adapted to install in contact with the entry door frame and position the attachment holes of the plate offset section there above using one or more fasteners to releasably affix the reinforcement plate thereto the back of the entry door frame.

In another exemplary embodiment of a reinforced door frame assembly having a door frame with two frame legs, a header and a sill, with a first frame leg having a back, a lock/latch bore to receive a throw bolt, and a weatherstrip slot, the assembly including a reinforcement plate having a first edge and a second edge, the reinforcement plate having a lock/latch opening formed therethrough to receive the throw bolt of the lockset, and positioned proximate the first edge, the reinforcement plate adapted to be fastened to the back of the entry door frame with the lock/latch opening adjacent the lock/latch bore in the first frame leg, a plate offset section proximate the second edge of the reinforcement plate, the plate offset configured of two spaced apart opposing bends therein the reinforcement plate to form the plate offset section, the plate offset section having attachment holes positioned therethrough proximate the second edge, and an elongated bar having one or more connecting holes formed therethrough and adapted to install in contact with the back of the first frame leg and position the attachment holes of the plate offset section there above using one or more fasteners to releasably affix the reinforcement plate thereto the back of the first frame leg.

In another exemplary embodiment of a method of installing an entry door frame reinforcement assembly on a back of a door frame leg having a lock/latch bore, including steps of providing a reinforcement plate having a first edge and a second edge, the reinforcement plate having a lock/latch opening formed therethrough and positioned proximate the first edge, a plate offset section proximate the second edge of the reinforcement plate, the plate offset configured of two spaced apart opposing bends therein the reinforcement plate to form the plate offset section, the plate offset section having attachment holes positioned therethrough proximate the second edge, an elongated bar having one or more connecting holes formed therethrough and adapted to install in contact with the door frame leg and position the attachment holes of the plate offset section there above using one or more fasteners to releasably affix the reinforcement plate thereto the back of the door frame leg, a support flange positioned therein the lock/latch opening and proximate the first edge, the support flange extends perpendicular to the reinforcement plate, and is adapted to extend therein the lock/latch bore, positioning the reinforcement plate and the elongated bar against the back of the door frame leg with the lock/latch opening adjacent the lock/latch bore in the door frame leg, ensuring that the support flange extends perpendicular into a portion of the lock/latch bore, and installing one or more fasteners through the attachment holes and the connecting holes and further extends therein the door frame to secure reinforcement plate thereto the back of the door frame leg.

A pre-hung door assembly comprising the reinforced door frame assembly of claim 8 and a door mounted on hinges thereto a second frame leg of the door frame with two frame legs.

The foregoing illustrative summary, as well as other exemplary objectives and/or advantages of the present disclosure, and the manner in which the same are accomplished, are further explained within the following detailed description and its accompanying drawings.

BRIEF DESCRIPTION OF THE DRAWINGS

The present disclosure will be better understood and aspects other than those set forth above will become apparent when consideration is given to the following detailed description, the appended claims and drawings. The same numerals are used to designate like components in these figures. Such description makes reference to the annexed drawing wherein:

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION OF PREFERRED EMBODIMENTS

In general, the following description adopts a terrestrial frame of reference, in which the bottom of a component is considered to be the side nearest the floor or earth when in normal use, and the top being the side opposite and facing upward. The term "face" is used to identify the portion of the door frame that is in closest proximity to the door and is visible after installation. The term "back" is used to identify the reverse portion of the door frame that is in closest proximity to the surrounding wall and its internal framing and is not visible after installation. The term "and/or" is used in the conventional sense, in which "A and/or B" indicates that A or B, or both, may be present.

A variety of typical mechanical fasteners can be used to assemble the components of the system embodiments described below, including without limitation nails, staples of various types, machine screws and bolts, wood and sheet metal screws, dowels and pins of various sorts. Persons skilled in the art will be well prepared to use the mechanical fasteners provided with the assembly or to provide or substitute fasteners of their own choices.

Figure 1:
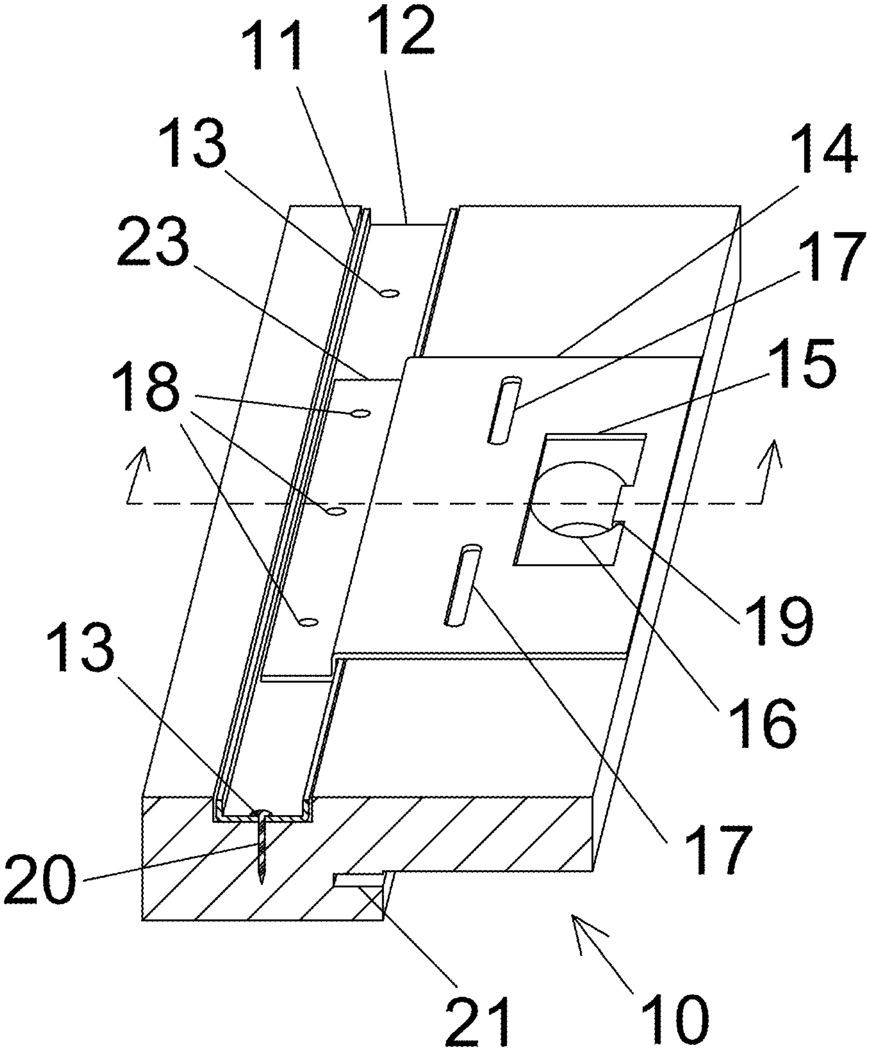
FIG. 1 is an oblique sectional view of the back of a door frame fitted with the described assembly.

With reference to FIG. 1, the back of the door frame (10) is shown with the shaped slot (11) machined or extruded into it. Positioned where the lock/latch bore (16) is located on the door frame (10) and within the shaped slot (11) is a U-shaped bar (12). The U-shaped bar (12) is fitted with a series of attachment holes (13) that allow fasteners (20) to pass through the shaped bar (12) and secure it in position within the shaped slot (11) and the door frame (10). The width and depth of the shaped slot (11) are slightly greater than the width and depth of the U-shaped bar (12) so as to allow the U-shaped bar (12) to be fully contained within it. Shaped plate (14) is then aligned with the lock/latch bore (16) and set into place so that it lies flat on the back of the door frame (10) and the offset section (23) of the shaped plate (14) sets within the U-shaped bar (12) and shaped slot (11). The shaped plate (14) is then attached to the back of the door frame (10) by inserting and securing fasteners (not shown) through the attachment holes (18) in the offset section (23) of the shaped plate (14) which align with slotted holes (hidden in this view) in the U-shaped bar (12). Shaped plate (14) has a lock/latch opening (15) that surrounds the lock/latch bore (16) that is cut into the frame (10) to allow for the throw bolt of the deadbolt or latch of the lockset (not shown) to pass through the frame (10). The edge of the lock/latch opening (15) in shaped plate (14) has a support flange (19) which extends into the lock/latch bore (16). The length of the support flange (19) is such that it does not extend fully through the lock/latch bore (16) so as not to interfere with the mounting of the decorative lock or latch cover (not shown). The support flange (19) is of a width and location so that it fits within the lock/latch bore (16) but still allows sufficient clearance for the latch or throw bolt (not shown) to be extended into and through the lock/latch bore (16). The support flange (19) helps to secure shaped plate (14) to door frame (10) and to support a longer length of the latch or throw bolt within bore (16). The shaped plate (14) also features two slotted holes (17) which are positioned so that, during installation, long fasteners (not shown) can be driven or screwed through the face of the door frame (10) adjacent to the weatherstrip slot (21), pass through the shaped plate (14) and penetrate and be secured to the framing within the wall that surrounds the entry. The location of the slotted holes (17) is such that the heads of the fasteners will be hidden from view when the weatherstrip (not shown) is installed into the weatherstrip slot (21) machined into the face of the door frame (10).

Figure 2:
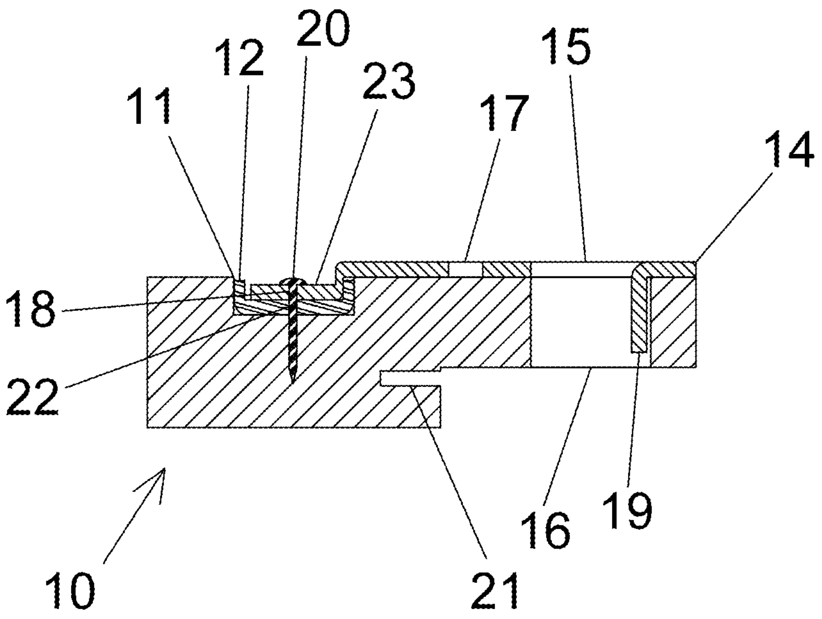
FIG. 2 is a cross-section AA' view of the door frame depicted in FIG. 1 with the described assembly attached.

With reference to FIG. 2, the door frame (10) cross section is shown with the shaped slot (11) machined or extruded into it. Positioned where the lock/latch bore (16) is located on the door frame (10) and within the shaped slot (11) is the U-shaped bar (12). The width and depth of the shaped slot (11) are slightly greater than the outer width and depth of the U-shaped bar (12) so as to allow the U-shaped bar (12) to be fully contained within it. The shaped plate (14) is then aligned with the lock/latch bore (16) and set into place so that it lies flat on the back of the door frame (10) and the offset section (23) of the shaped plate (14) drops within the U-shaped bar (12) and shaped slot (11). The offset section (23) of the shaped plate (14) is then attached to the back of the door frame (10) by inserting and securing fasteners (20) through the holes (18) in the offset section (23) of the shaped plate (14) which align with slotted holes (22) in the U-shaped bar (12). The shaped plate (14) has a lock/latch opening (15) that surrounds the lock/latch bore (16) that is cut into the door frame (10) to allow for the throw bolt and/or latch (not shown) to pass through the door frame (10). The edge of the lock/latch opening (15) includes a support flange (19) which extends into the lock/latch bore (16). The support flange (19) is of a width, thickness and location such that it fits within the lock/latch bore (16) but still allows sufficient clearance for the latch or throw bolt (not shown) to be extended into and through the lock/latch bore (16). The length of the support flange (19) is such that it does not extend fully through the lock/latch bore (16). The shaped plate (14) also features slotted holes (17) which are positioned so that, during installation, long fasteners (not shown) can be driven though the face of the door frame (10) next to the weatherstrip slot (21), pass through the shaped plate (14) and penetrate and be secured to the wall that surrounds the entry. The locations of the slotted holes (17) are such that the heads of the fasteners (not shown) are located next to the weatherstrip slot (21) so that when the weatherstrip (not shown) is installed the heads of the fasteners (not shown) will be hidden from view.

Figure 3B:
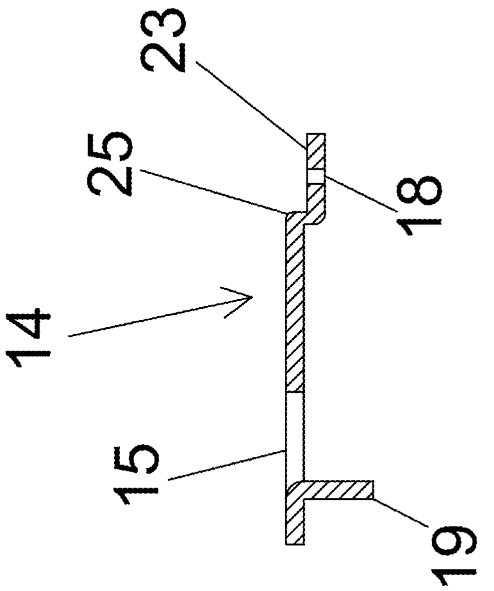
FIGS. 3A and 3B are, respectively, the face and cross-section AA' views of the shaped plate component of the described assembly.
Figure 3A:
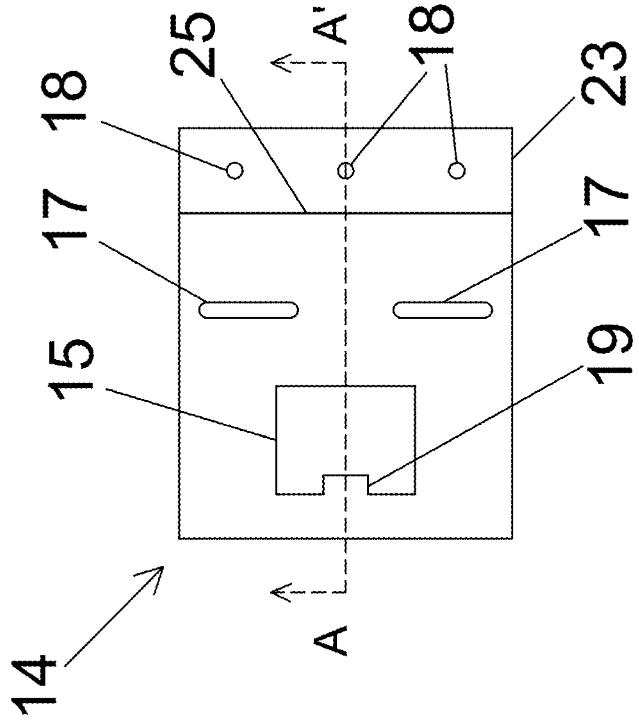

With reference to FIGS. 3A and 3B, the shaped plate (14) is shown with the lock/latch opening (15) and support flange (19) that are to, respectively, surround and fit within the lock/latch bore (not shown) of the door frame (not shown). The shaped plate (14) features a plate offset (25) that creates an offset section (23) that will fit within the U-shaped bar (not shown). The offset section (23) has a series of attachment holes (18) where fasteners (not shown) will be inserted to secure the offset section (23) of the shaped plate (14) within the U-shaped bar (not shown) and to the back of the door frame (not shown). The shaped plate (14) also features a pair of slotted holes (17) that allow for long fasteners (not shown) to pass through the shaped plate (14) as they are driven into the face of the door frame (not shown) and into the framing that surrounds the door entry. Shaped plate's (14) flange (19) and offset section (23) can be formed in metal by simple cutting and bending operations or can be produced by molding and/or machining of composite materials.

Figure 4B:
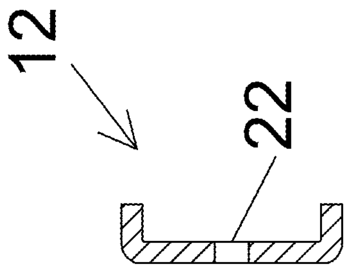
FIGS. 4A and 4B are, respectively, the face and cross-section AA' views of the U-shaped bar component of the described assembly.
Figure 4A:
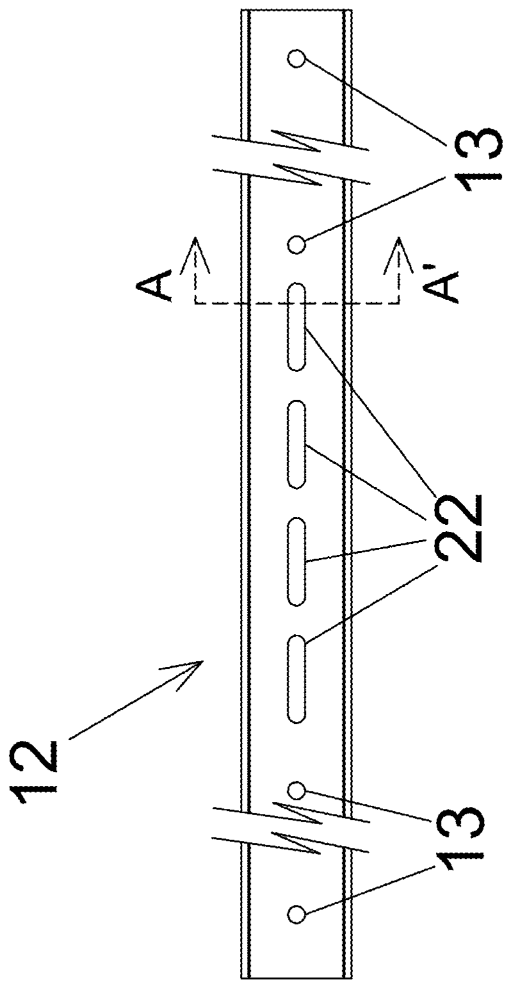

With reference to FIGS. 4A and 4B, the U-shaped bar (12) is shown with a number of attachment holes (13) and slotted holes (22) located down the centerline so that the U-shaped bar (12) can be inserted into the shaped slot (not shown) with either end oriented to the top of the door frame (not shown). When the U-shaped bar (12) has been inserted into the correct location in the shaped slot (not shown) in the back of the door frame (not shown), a series of fasteners (not shown) will be inserted through the attachment holes (13) so as to secure the shaped bar (12) firmly to the back of the door frame (not shown). The shaped plate (14) (not shown) is then positioned within the U-shaped bar (12) and fasteners (not shown) are inserted through the attachment holes in the offset section of the shaped plate (not shown here; see FIG. 3A/3B.) and through the slotted holes (22) and secured to the door frame (not shown) so as to hold the shaped plate (14) (not shown) securely within the U-shaped bar (12).

Figure 5:
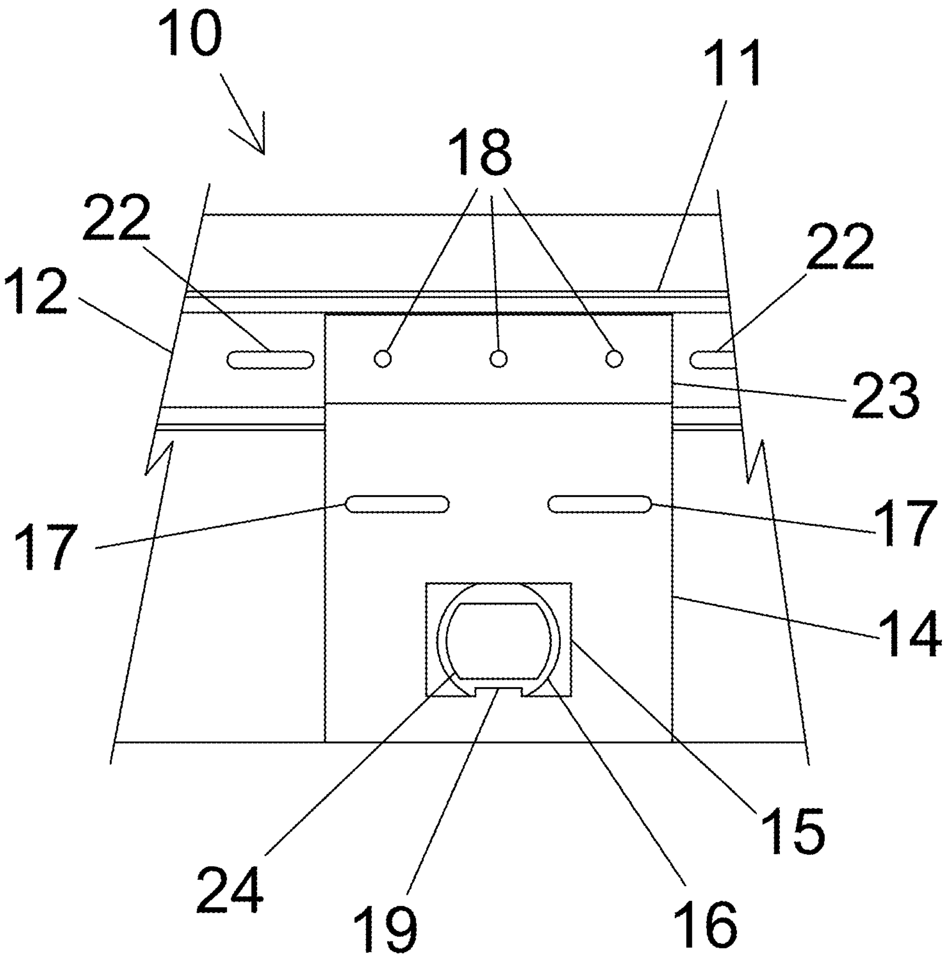
FIG. 5 is a plan view of the back of the door frame showing the location of the assembly in relation to the lock bore and throw bolt.

With reference to FIG. 5, the previously described back of the door frame (10) is shown fitted with both the U-shaped bar (12) and shaped plate (14) and with the location of the throw bolt (24) relative to these pieces shown. The U-shaped bar (12) is secured in place using fasteners (not shown) which pass through the series of attachment holes (not shown) and into the back of the door frame (10). The shaped plate (14) is secured in place using fasteners (not shown) that pass through both the attachment holes (18) and the slotted holes (22) located in the offset section (23) of the shaped plate (14) and into the back of the door frame (10). The lock/latch opening (15) surrounds the lock/latch bore (16) and the support flange (19) fits into the lock/latch bore (16). The shape, size and location of the support flange (19) is such that the throw bolt (24) of the door deadbolt has clearance and will extend through the door frame (10) without interference. The previously described slotted holes (17) in the shaped plate (14) are also shown.

Figure 6:
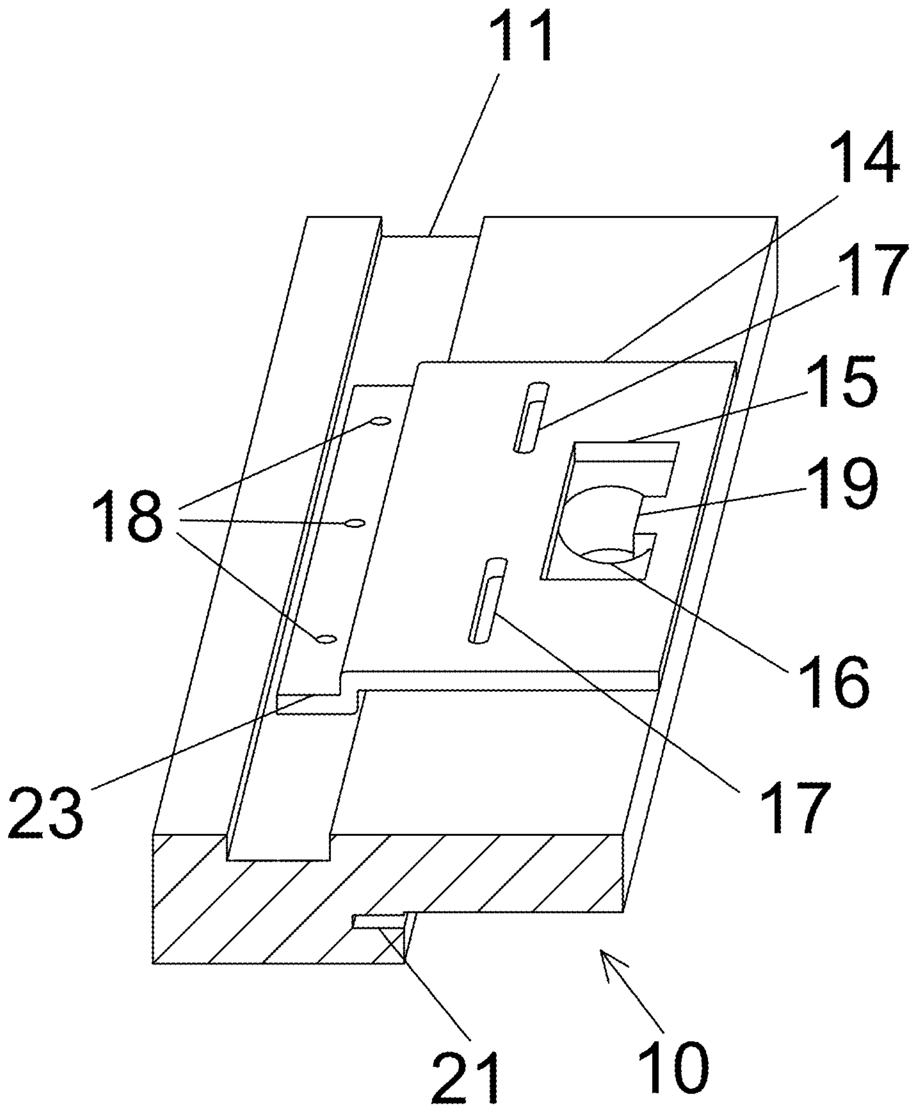
FIG. 6 is an oblique sectional view of the back of a door frame fitted with only the shaped plate.

With reference to FIG. 6, the previously described door frame (10) is shown fitted with only the shaped plate (14) within shaped slot (11), without the need of a U-shaped bar. The shaped plate (14) is secured within the shaped slot (11) using fasteners (not shown) that pass through the attachment holes (18) located in the offset section (23) of the shaped plate (14) and into the back of the door frame (10). The lock/latch opening (15) surrounds the lock/latch bore (16) and the support flange (19) fits into the lock/latch bore (16). The previously described slotted holes (17) in the shaped plate (14) are also shown.

Figure 7:
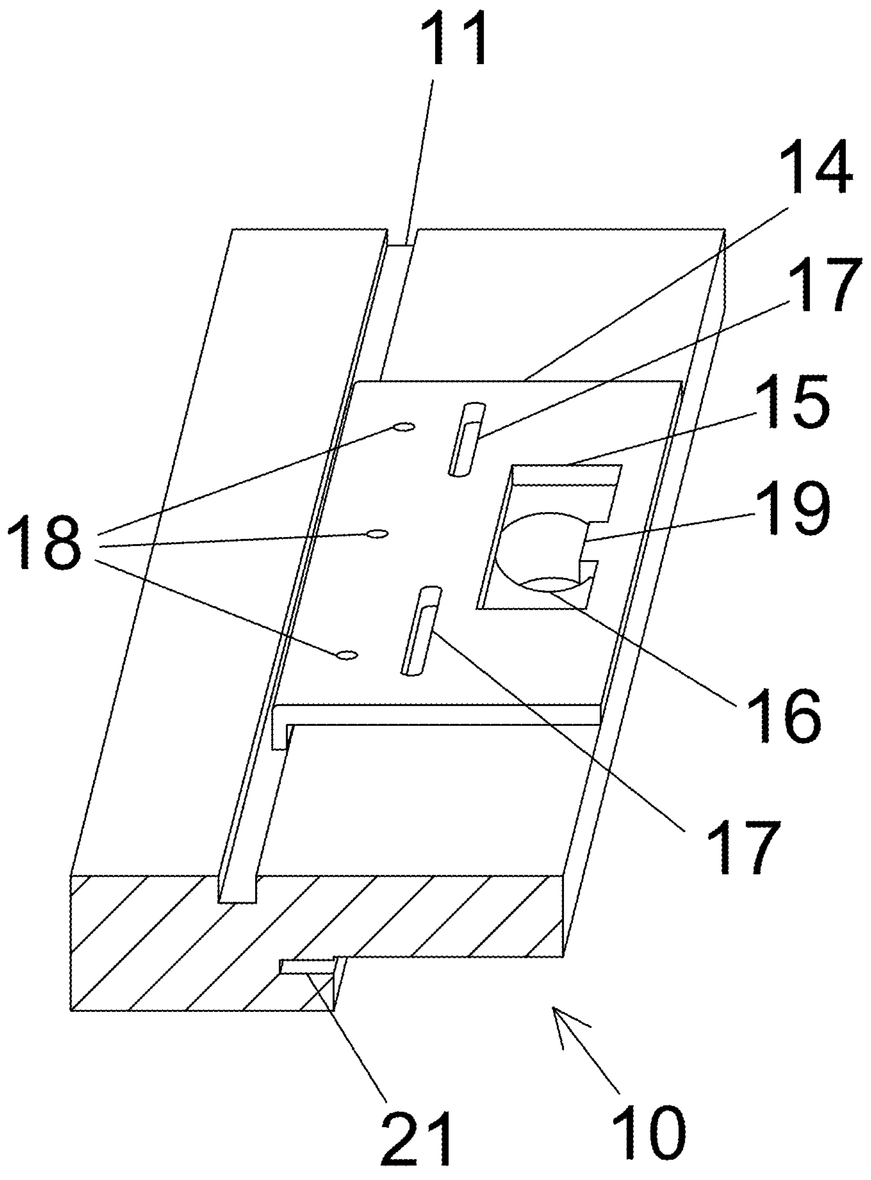
FIG. 7 is an oblique sectional view of the back of a door frame fitted with an alternative version of the shaped plate only.

With reference to FIG. 7, the previously described door frame (10) is shown fitted with only the modified shaped plate (14). The shaped plate (14) is simply secured within a shaped slot (11), of reduced width, using fasteners (not shown) that pass through the attachment holes (18), that have been moved to an alternate location in the plate (14), and into the back of the door frame (10). The lock/latch opening (15) surrounds the lock/latch bore (16) and the support flange (19) fits into the lock/latch bore (16). The previously described slotted holes (17) in the shaped plate (14) are also shown.

Figure 8:
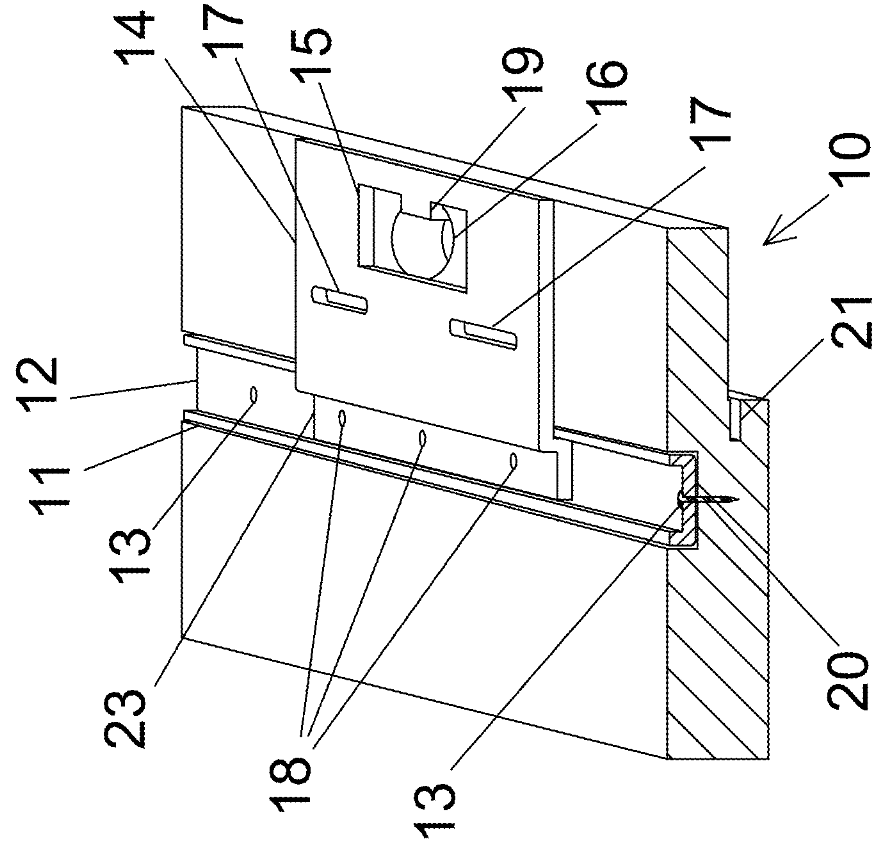
FIG. 8 is an oblique sectional view of the back of a wider door frame fitted with the described assembly.

With reference to FIG. 8, a wider version of the previously described door frame (10) is shown fitted with shaped slot (11) machined or extruded into it. The shaped slot (11) is located the same distance from the thin edge of the door frame (10), so as a result the same size U-shaped bar (12) and shaped plate (14) can be used to reinforce this wider frame without modification. Positioned where the lock/latch bore (16) is located on the door frame (10) and within the shaped slot (11) is a U-shaped bar (12). The U-shaped bar (12) is fitted with a series of attachment holes (13) that allow fasteners (20) to pass through the U-shaped bar (12) and secure it in position within the shaped slot (11) and the door frame (10). The width and depth of the shaped slot (11) are slightly greater than the width and depth of the U-shaped bar (12) so as to allow the U-shaped bar (12) to be fully contained within it. Shaped plate (14) is then aligned with the lock/latch bore (16) and set into place so that it lies flat on the back of the door frame (10) and the offset section (23) of the shaped plate (14) sets within the U-shaped bar (12) and shaped slot (11). The shaped plate (14) is then attached to the back of the door frame (10) by inserting and securing fasteners (not shown) through the attachment holes (18) in the offset section (23) of the shaped plate (14) which align with slotted holes (hidden in this view) in the U-shaped bar (12). Shaped plate (14) has a lock/latch opening (15) that surrounds the lock/latch bore (16) that is cut into the frame (10) to allow for the throw bolt of the deadbolt or latch of the lockset (not shown) to pass through the frame (10). The edge of the lock/latch opening (15) has a support flange (19) which extends into the lock/latch bore (16). The length of the support flange (19) is such that it does not extend fully through the lock/latch bore (16) so as not to interfere with the mounting of the decorative lock or latch cover (not shown). The support flange (19) is of a width and location so that it fits within the lock/latch bore (16) but still allows sufficient clearance for the latch or throw bolt (not shown)

to be extended into and through the lock/latch bore (16). The shaped plate (14) also features two slotted holes (17) which are positioned so that, during installation, long fasteners (not shown) can be driven or screwed through the face of the door frame (10) adjacent to the weatherstrip slot (21), pass through the shaped plate (14) and penetrate and be secured to the framing within the wall that surrounds the entry. The location of the slotted holes (17) is such that the heads of the fasteners will be hidden from view when the weatherstrip (not shown) is installed into the weatherstrip slot (21) machined into the face of the door frame (10).

Figure 9:
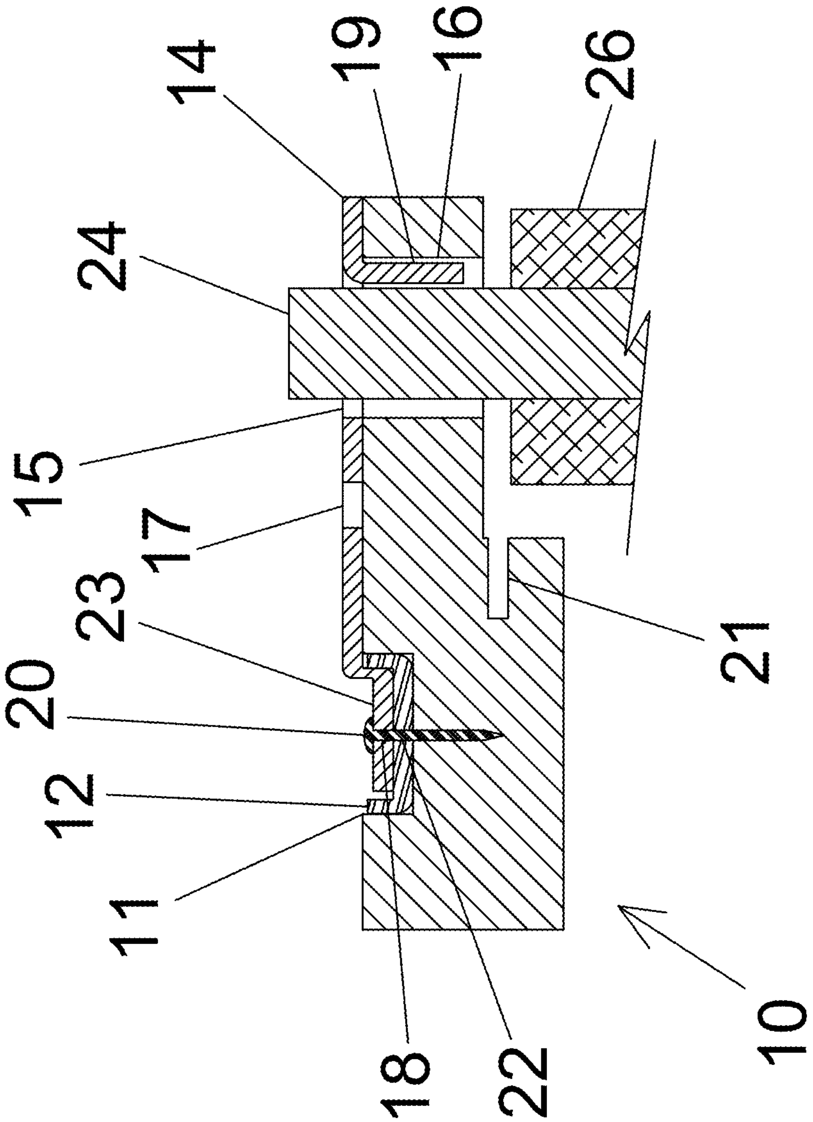
FIG. 9 is a cross-section AA' view of the door frame depicted in FIG. 1 with the addition of a door edge and throw bolt extended in the locked position.

With reference to FIG. 9, the door frame (10) cross section is shown with the shaped slot (11) machined or extruded into it. Positioned where the lock/latch bore (16) is located on the door frame (10) and within the shaped slot (11) is the U-shaped bar (12). The width and depth of the shaped slot (11) are slightly greater than the outer width and depth of the U-shaped bar (12) so as to allow the U-shaped bar (12) to be fully contained within it. The shaped plate (14) is then aligned with the lock/latch bore (16) and set into place so that it lies flat on the back of the door frame (10) and the offset section (23) of the shaped plate (14) drops within the U-shaped bar (12) and shaped slot (11). The offset section (23) of the shaped plate (14) is then attached to the back of the door frame (10) by inserting and securing fasteners (20) through the holes (18) in the offset section (23) of the shaped plate (14) which align with slotted holes (22) in the U-shaped bar (12). The shaped plate (14) has a lock/latch opening (15) that surrounds the lock/latch bore (16) that is cut into the door frame (10) to allow for the throw bolt (24) of the deadbolt (not shown) to be extended from the edge of the door (26) and pass through the door frame (10) when the deadbolt (not shown) is locked. The edge of the lock/latch opening (15) includes a support flange (19) which extends into the lock/latch bore (16). The support flange (19) is of a width, thickness and location such that it fits within the lock/latch bore (16) but still allows sufficient clearance for the latch or throw bolt (24) to be extended into and through the lock/latch bore (16). The length of the support flange (19) is such that it does not extend fully through the lock/latch bore (16). The shaped plate (14) also features slotted holes (17) which are positioned so that, during installation, long fasteners (not shown) can be driven though the face of the door frame (10) next to the weatherstrip slot (21), pass through the shaped plate (14) and penetrate and be secured to the wall that surrounds the entry. The location of the slotted holes (17) is such that the heads of the fasteners (not shown) are located next to the weatherstrip slot (21) so that when the weatherstrip (not shown) is installed the heads of the fasteners (not shown) will be hidden from view.

Figure 10:
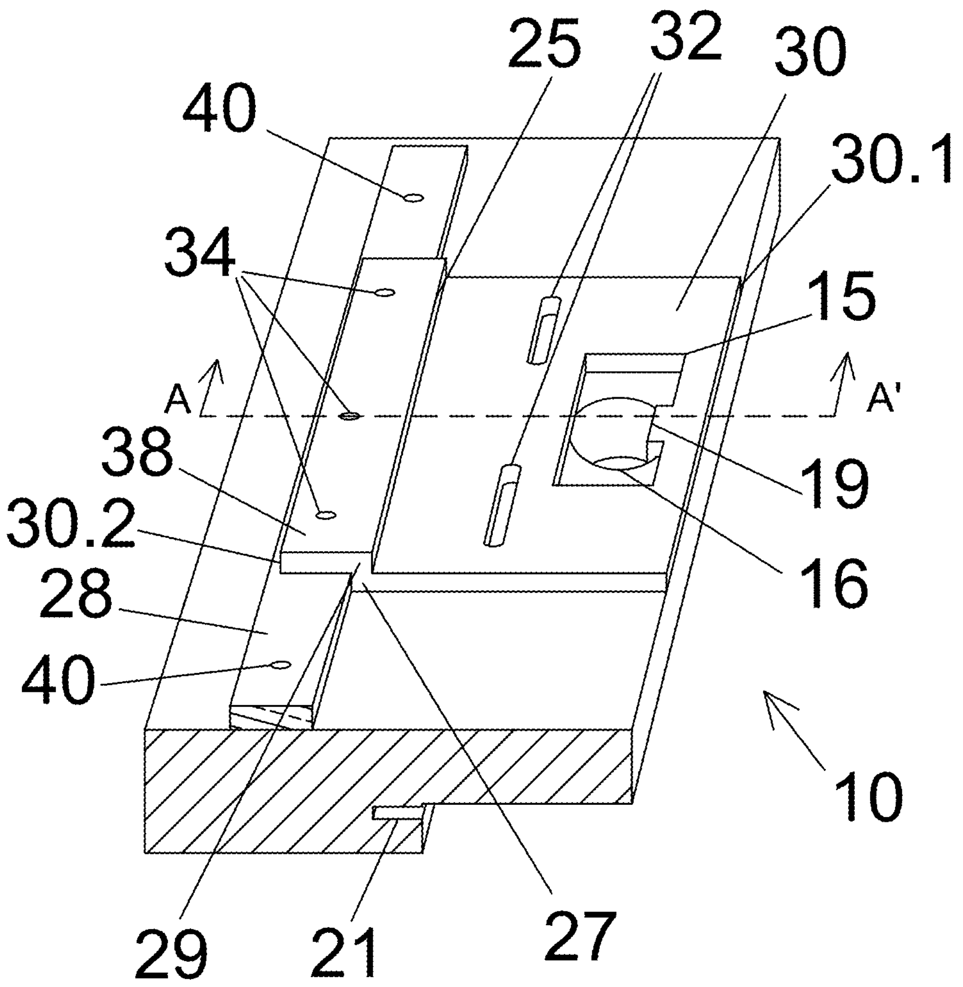
FIG. 10 is an oblique sectional view of the back of a door frame fitted with an alternate shaped plate and rectangular bar that doesn't require the cutting of a slot in the back of the door frame, according to select embodiments of the disclosure.

With reference to FIG. 10, back of entry door frame (10) is shown. Preferably attached to the back of door frame (10) is an entry door frame reinforcement assembly, reinforced door frame assembly, or reinforcement plate, such as alternate shaped plate (30) having first edge 30.1 and second edge 30.2, which in this preferred embodiment is aligned with lock/latch bore (16) therein door frame (10) and set into place so that alternate shaped plate (30) is preferably positioned approximately flat on the back of door frame (10), wherein support flange (19) projects through and aligns to the outer edge of lock/latch bore (16). It is contemplated herein that alternate shaped plate (30) and support flange (19) together may provide additional strength and holding power to thwart the forces associated with an attempted forced entry of the door by spreading or dissipating such forces over a sufficient length of the door frame to ensure the frame remains intact, and the forced entry is thwarted. Preferably, alternate shaped plate (30) is then releasably attached to the back of door frame (10) by inserting an elongated bar, such as rectangular bar (28) between plate offset section (38) of alternate shaped plate (30) and the back of door frame (10) and one or more fasteners (20) (not shown in this view) may be releasably inserted through one or more aperture(s), such as attachment hole(s) (34) positioned preferably along the centerline of plate offset section (38) of alternate shaped plate (30) which align with one or more aperture(s), such as connecting hole(s) (40) positioned preferably along the centerline of rectangular bar (28). Alternate shaped plate (30) may include lock/latch opening (15) configured to surround lock/latch bore (16) that is cut into frame (10) to allow for the throw bolt (24) of the deadbolt or latch of the lockset (not shown) to pass through frame (10). The edge of lock/latch opening (15) in alternate shaped plate (30) has a support flange (19) which extends approximately perpendicular to alternate shaped plate (30) and extends into lock/latch bore (16). The length of support flange (19) is preferably such that it does not extend fully through lock/latch bore (16) so as not to interfere with the mounting of the decorative lock or latch cover (not shown) but other lengths are included herein. Support flange (19) may be of a width and location so that it fits within lock/latch bore (16) but still allows sufficient clearance for the latch or throw bolt 24 (not shown) to be extended into and through lock/latch bore (16). Support flange (19) helps to position alternate shaped plate (30) to door frame (10) and to support a longer length of the latch or throw bolt within bore (16) as compared to only an edge of alternate shaped plate (30). Alternate shaped plate (30) may also feature at least one or more aperture(s), such as one or more slotted hole(s) (32) positioned therethrough alternate shaped plate (30) preferably between lock/latch opening (15) and plate offset configured of two spaced apart opposing bends 27, 29 (preferably a double ninety (90) degree bend), which may be positioned so that during installation long fasteners (20) (not shown) can be driven or screwed through the face of door frame (10) adjacent to weatherstrip slot (21), pass through alternate shaped plate (30) and penetrate and be secured to the framing within the wall that surrounds the entry. Preferably, the location of slotted holes (32) is such that the heads of fasteners (20) may be hidden from view when the weatherstrip (not shown) is installed into weatherstrip slot (21), which is preferably machined into the face of door frame (10). Once alternate shaped plate (30) and rectangular bar (28) have been secured to the back of door frame (10) additional fasteners (20) (not shown) may be secured through one or more connecting holes (40) in rectangular bar (28) which serves to further secure rectangular bar (28) directly and alternate shaped plate (30) indirectly to the back of door frame (10).

Figure 11B:
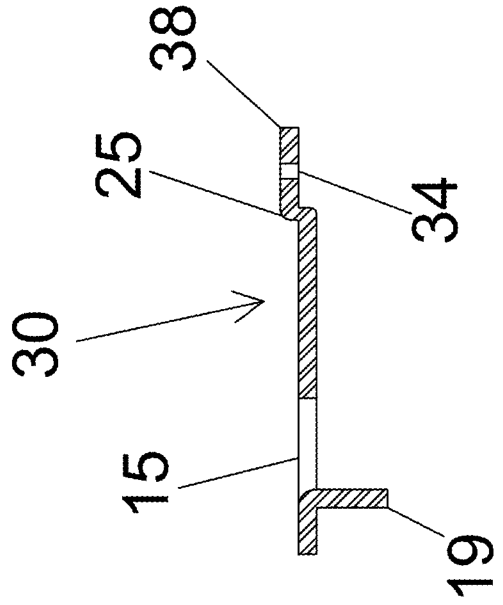
FIGS. 11A and 11B are, respectively, the face and cross section AA' views of the alternate shaped plate component of the described alternate assembly, according to select embodiments of the disclosure.
Figure 11A:
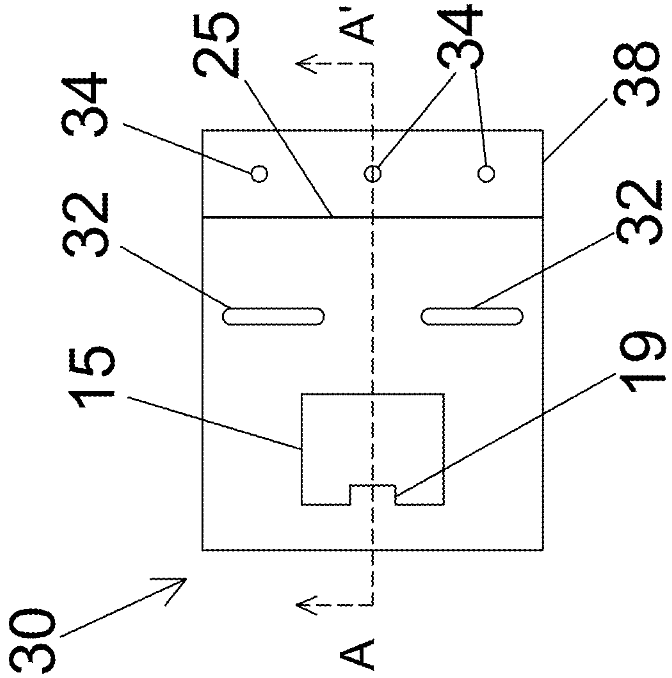

With reference to FIGS. 11A and 11B, alternate shaped plate (30) is shown. Alternate shaped plate (30) is shown with lock/latch opening (15) and support flange (19) that are to, respectively, surround and fit within the lock/latch bore 16 (not shown) of the door frame (10) (not shown). Alternate shaped plate (30) features a plate offset (25) proximate second side 19 preferably configured of two closely spaced apart opposing bends 26, 27 that create an plate offset section (38) from alternate shaped plate (30) that may be substantially parallel to a body 31 of alternate shaped plate (30). The resulting plate offset section (38) may be offset a sufficient distance to provide clearance for the rectangular bar 28 (not shown) to be place between plate offset section (38) of alternate shaped plate (30) and the back of the door frame (10) (not shown) while allowing the body of alternate shaped plate (30) to remain resting flat against the back of the door frame 10 (not shown). Plate offset section (38) has a series of attachment holes (34) where fasteners 20 (not shown) may be inserted to secure plate offset section (38) of alternate shaped plate (30) to the rectangular bar 28 (not shown) and to the back of the door frame (10) (not shown). Alternate shaped plate (30) may include a pair of slotted holes (32) that allow for long fasteners 20 (not shown) to pass through alternate shaped plate (30) as they are driven into the face of the door frame (10) (not shown) and into the framing that surrounds the door entry. Alternate shaped plate's (30) support flange (19) and plate offset section (38) may be formed in metal by simple cutting and bending operations or can be produced by molding and/or machining, and can be formed of composite materials.

Figure 12B:
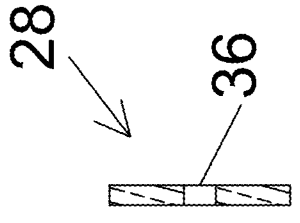
FIGS. 12A and 12B are, respectively, the face and cross section AA' views of the rectangular bar component of the described alternate assembly, according to select embodiments of the disclosure.
Figure 12A:
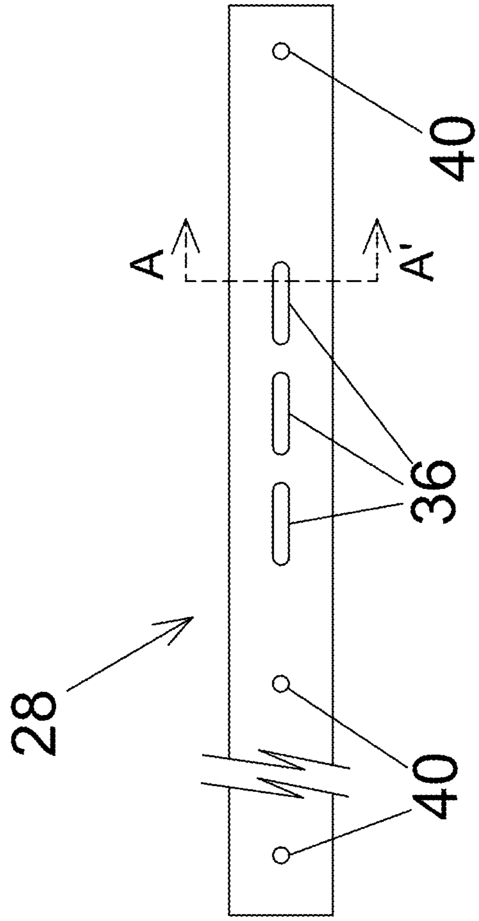

With reference to FIGS. 12A and 12B, rectangular bar (28) is shown with a number of connecting holes (40) and one or more aperture(s), such as slotted hole(s) (36) positioned preferably along the centerline of rectangular bar (28). These holes allow for rectangular bar (28) to be secured to the back of the door frame (10) (not shown) both by itself through connecting holes (40) and in combination with the alternate shaped plate (30) (not shown) through slotted holes (36). When rectangular bar (28) has been inserted between the back of the door frame (10) (not shown) and the offset section of the alternate shaped plate (30) (not shown), a series of fasteners (20) (not shown) may be inserted through the attachment holes in plate offset section (38) of the alternate shaped plate (30) (not shown) so as to secure both rectangular bar (28) and alternate shaped plate (30) (not shown) firmly to the back of the door frame (10) (not shown). Rectangular bar (28) may include a series of fasteners (20) (not shown) inserted through connecting holes (40) to further secure rectangular bar (28) to the back of door frame (10) (not shown).

Figure 13:
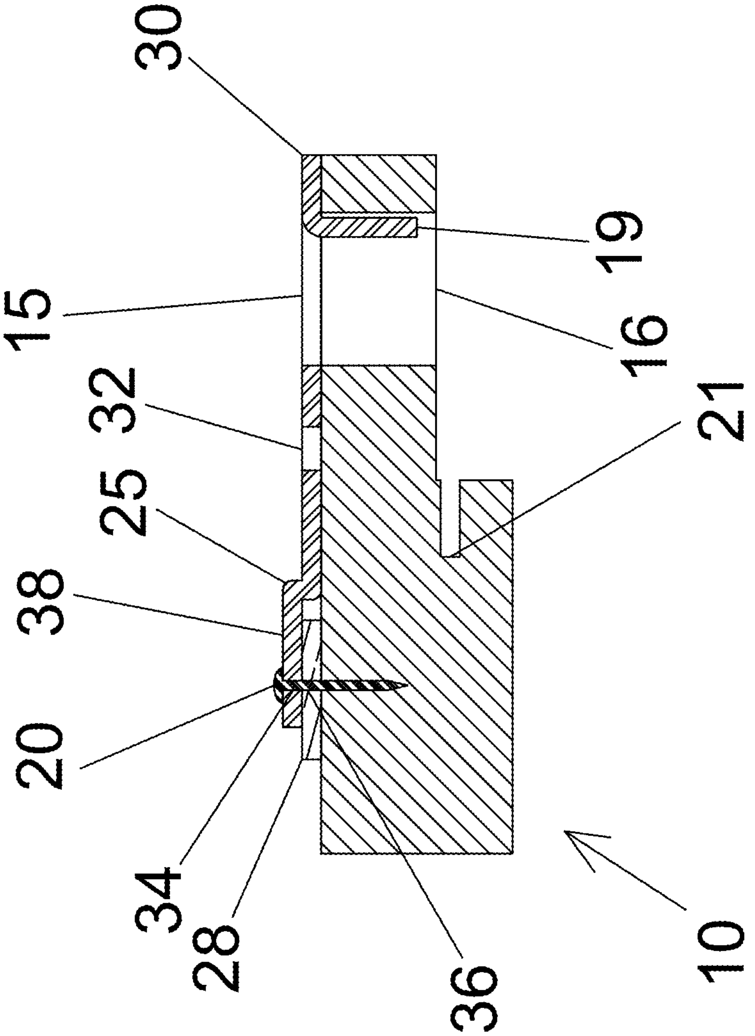
FIG. 13 is a cross-section AA' view of the door frame depicted in FIG. 10 with the described alternate assembly attached, according to select embodiments of the disclosure.

With reference to FIG. 13, door frame (10) cross section is shown with alternate shaped plate (30) adapted to be install(ed), attached or fasten(ed) in place, held in place, affix(ed), releasably affix(ed) in contact to the back of door frame (10) via fastener(s) (20). Positioned(ing) alternate shaped plate (30) and elongated bar (28) against the back of door frame leg (10) where lock/latch bore (16) is located on door frame (10), alternate shaped plate (30) is then aligned with lock/latch opening (15) adjacent the lock/latch bore (16) and set/secured into place so that it lies flat on the back of door frame, two frame legs, or first and second door frame leg (10) and plate offset section (38) of alternate shaped plate (30) sets on top of or partially wraparound rectangular bar (28). Plate offset section (38) of alternate shaped plate (30) may be attached to the back of door frame (10) by inserting and securing fasteners (20) through attachment holes (34) in plate offset section (38) of alternate shaped plate (30) which align with slotted holes (36) in rectangular bar (28). Alternate shaped plate (30) has a lock/latch opening (15) that surrounds lock/latch bore (16) that is cut into door frame (10) to allow for throw bolt 24 and/or latch (not shown) to pass through door frame (10). The outer edge of lock/latch opening (15) includes support flange (19) which extends into lock/latch bore (16) to provide elongated support of throw bolt (24). Support flange (19) is preferably of a width, thickness and location such that it fits within lock/latch bore (16) but still allows sufficient clearance for the latch or throw bolt (24) (not shown) to be extended into and through lock/latch bore (16) and proximate support flange (19). The length of support flange (19) is to ensure(ing) that it preferably extends perpendicular into a portion of the lock/latch bore (16) opening but does not extend fully through lock/latch bore (16). Alternate shaped plate (30) also features slotted holes (32) which are positioned so that, during installation, long fasteners (20) (not shown) can be driven though the face of door frame (10) next to weatherstrip slot (21), pass through alternate shaped plate (30) and penetrate and be secured to the wall frame that surrounds the entry. The locations of slotted holes (32) are such that the heads of the fasteners (20) (not shown) are located next to weatherstrip slot (21) so that when the weatherstrip (not shown) is insert(ed) or installed the heads of the fasteners (20) (not shown) will be hidden from view (hide).

The operation of certain disclosed embodiments will be further illustrated by the following examples:

EXAMPLES

Example 1—A U-shaped bar and shaped plate were fabricated by cutting and bending 16-gage galvanized sheet steel (ASTM A653 CS Type B) into the shapes depicted in FIGS. 3 and 4. The dimensions of the U-shaped bar were 0.875"×0.300"×15.75". The dimensions of the shaped plate were 3.600"×3.500"×0.300" (at the offset). A strike side door frame was prepared from pine lumber with a correctly sized shaped slot machined into the back of the door frame and latch/deadbolt holes and mortises were machined into the door frame. The U-shaped bar and one shaped plate were installed, as described previously in the detailed description, onto the back of the strike frame leg with the shaped plate located at the deadbolt. A hinge side door frame was prepared from pine lumber and three hinge mortises were machined into it. A door frame header was prepared from pine lumber and cut to the required length. A commercially available residential door sill was procured and trimmed to the correct length. A solid wood door (36"×78"×1¾") was prepared by machining bores and mortises for the lock and deadbolt and for three hinges. The door frame legs, door frame head and sill were assembled using 3" construction screws into a door frame and the door was mounted to the frame using three commercially available hinges. A commercially available ANSI 1 level lockset was installed in the door. Decorative latch and deadbolt cover plates (light duty) were mounted into the mortises of the strike jamb. The door and frame set were then mounted into the test fixture prescribed in ASTM F476-14. The door was closed and both the latch and deadbolt were locked. The door was then subjected to the door impact test protocol described in section 17 of ASTM F476-14 by an independent test lab. The door assembly successfully endured all levels of impact up to and including the highest Grade 40 level (two impacts each of 80, 120 160 and 200 Joules or 59.0, 88.5, 118.0 and 147.5 ft-lbf). The strike jamb showed no cracking or other damage as a result of the testing.

Example 2—A U-shaped bar and shaped plate were fabricated by cutting and bending 16-gage galvanized sheet steel (ASTM A653 CS Type B) into the shapes depicted in FIGS. 3 and 4. The dimensions of the U-shaped bar were 0.875"×0.300"×15.72". The dimensions of the shaped plate were 3.600"×3.500"×0.300" (at the offset). A strike side door frame was prepared from pine lumber with a correctly sized shaped slot machined into the back of the door frame and latch/deadbolt holes and mortises were machined into it. The U-shaped bar and one shaped plate were installed, as described previously in the detailed description, onto the back of the strike frame leg with the shaped plate located at the deadbolt. A hinge side door frame was prepared from pine lumber and three hinge mortises were machined into it. A door frame header was prepared from pine lumber and cut to the required length. A commercially available residential door sill was procured and trimmed to the correct length. A solid wood door (36"×78"×1¾") was prepared by machining bores and mortises for the lock and deadbolt and for three hinges. The door frame legs, door frame head and sill were assembled using 3" construction screws into a door frame and the door was mounted to the frame using three commercially available hinges. A commercially available ANSI 3 level lockset was installed in the door. Decorative latch and deadbolt cover plates (light duty) were mounted into the mortises of the strike jamb. The door and frame set were then mounted into the test fixture prescribed in ASTM F476-14. The door was closed and both the latch and deadbolt were locked. The door was then subjected to the door impact test protocol described in section 17 of ASTM F476-14 by an independent test lab. The door assembly successfully endured the first two levels of impact (Grade 10 and 20) and had a failure of the ANSI 3 deadbolt at the start of the Grade 30 level of testing (two impacts each of 80 and 120 Joules, failing at first impact of 160 Joules).

Example 3—Rectangular bar (28) and alternate shaped plate (30) may be fabricated by cutting and bending 14-gage galvanized sheet steel (ASTM A653 CS Type B) into the shapes depicted in FIGS. 11 and 12. The preferred dimensions of rectangular bar (28) are 0.875"×0.075"×12.75". The preferred dimensions of alternate shaped plate (30) are 3.600"×3.500"×0.160" (at the offset). Four pre-hung exterior doors were purchased from a building products retailer. The doors were produced by Masonite® and were 36"×80"×1.75" doors with two having steel faces and two having fiberglass faces. Four exterior deadbolt and latch hardware lockset were purchased from a building products retailer. Two of the locksets were rated ANSI 1 (Kwikset®) and two were rated ANSI 3 (Defender®). The decorative latch and deadbolt cover plates provide with the locksets were mounted into the mortises of the strike jamb. The two ANSI 1 locksets and two ANSI 3 locksets were combined with the two types of doors to create four combinations (Steel/ANSI 1, Steel/ANSI 3, Fiberglass/ANSI 1 & Fiberglass/ANSI 3). Each door and frame set was then mounted into the test fixture prescribed in ASTM F476-14. The door was closed and both the latch and deadbolt/throw bolt (24) were locked. The door was then subjected to the door impact test protocol described in section 17 of ASTM F476-14 by an independent test lab. All four door assemblies successfully endured all levels of impact up to and including the highest Grade 40 level (two impacts each of 80, 120 160 and 200 Joules or 59.0, 88.5, 118.0 and 147.5 ft-lbf). Based on these results the alternate shaped plates and rectangular bar combination described in this specification were able to prevent forced entry by impact up to the highest-level set by the ASTM F476-14 test methodology.

Published testing by Kikgard, another commercially available door reinforcement product, showed that a typical softwood door frame without reinforcement will break and allow the door to be forced open at the lowest impact level (80 Joules) so that it will fail to achieve even the lowest Grade 10 performance level. With the addition of either the U-shaped bar and the shaped plate or the rectangular bar and alternate shaped plate describe above, the ability of the pine door frame to resist the impact of forced entry was significantly improved so that the maximum amount of impact that the door can be subjected to without failure was determined by the strength of the door and lockset used, as the reinforced frame did not fail in testing.

In the foregoing description, certain terms have been used for brevity, clarity and understanding. All equivalent relationships to those illustrated in the drawings and described in the preferred embodiment are to be encompassed by this present disclosure to produce the intended results. It is also to be understood that the following claims are intended to cover all of the generic and specific features of the present disclosure herein described, and all statements of the scope of the present disclosure which, as a matter of language, might be said to fall therebetween.

The foregoing description comprises illustrative embodiments. Having thus described example embodiments, it should be noted by those skilled in the art that the within disclosures are example only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

What is claimed:

1. An entry door frame reinforcement assembly for an entry door frame having a back, a lock/latch bore to receive a throw bolt, and a weatherstrip slot, the entry door frame reinforcement assembly, comprising:

a) a reinforcement plate having a first edge and a second edge, said reinforcement plate having a lock/latch opening formed therethrough to receive the throw bolt and positioned proximate said first edge, said reinforcement plate adapted to be fastened to the back of the entry door frame with said lock/latch opening adjacent the lock/latch bore in the entry door frame;

b) a plate offset section proximate said second edge of said reinforcement plate, said plate offset configured of two spaced apart opposing bends therein said reinforcement plate to form said plate offset section such that a uniform gap is created between said plate offset section and said back of the entry door frame, said plate offset section having attachment holes positioned therethrough proximate said second edge; and c) an elongated rectangular bar having a thickness corresponding to said uniform gap, one or more connecting holes formed therethrough and adapted to be positioned within said uniform gap in contact with the back of the entry door frame;

d) one or more fasteners extending through said attachment holes of the plate offset section and said connecting holes of said rectangular bar to releasably affix said reinforcement plate and said rectangular bar to the back of the entry door frame.

2. The assembly of claim 1, wherein said attachment holes are adapted to position and install said reinforcement plate in contact with the entry door frame using one or more fasteners.

3. The assembly of claim 1, wherein said reinforcement plate further comprising at least one slotted hole positioned between said lock/latch opening and said two spaced apart opposing bends, to reinforce said reinforcement plate in contact with the entry door frame using one or more fasteners.

4. The assembly of claim 1, wherein said reinforcement plate further comprising a support flange positioned therein said lock/latch opening and proximate said first edge, said support flange extends substantially perpendicular to said reinforcement plate, and is adapted to extend into the lock/latch bore to reinforce the throw bolt.

5. The assembly of claim 1, wherein said elongated bar is secured in a groove in the back of the entry door frame.

6. The assembly of claim 1, wherein said two spaced apart opposing bends further comprising a double ninety (90) degree bend to form said plate offset section.

7. The assembly of claim 6, wherein said plate offset section is configured to partially wraparound said elongated bar to reinforce said reinforcement plate.

8. The assembly of claim 7, wherein said plate offset section and said elongated bar are held in place by said one or more fasteners.

9. The assembly of claim 1 wherein said reinforcement plate is of a length to spread an impact load along said the entry door frame to prevent failure thereof.

10. The assembly of claim 1 wherein said reinforcement plate and said elongated bar is of a length to spread an impact load along said the entry door frame to prevent failure thereof.

11. The assembly of claim 3, further comprising a weatherstrip configured to insert therein the weatherstrip slot to hide one or more fasteners inserted therein said at least one slotted hole.

12. A reinforced door frame assembly having a door frame with two frame legs, a header and a sill, with a first frame leg having a back, a lock/latch bore to receive a throw bolt, and a weatherstrip slot, the entry door frame reinforcement assembly comprising:

a) a reinforcement plate having a first edge and a second edge, said reinforcement plate having a lock/latch opening formed therethrough to receive the throw bolt of the lockset, and positioned proximate said first edge, said reinforcement plate adapted to be fastened to the back of the first frame leg with said lock/latch opening adjacent the lock/latch bore in the first frame leg;

b) a plate offset section proximate said second edge of said reinforcement plate, said plate offset configured of two spaced apart opposing bends therein said reinforcement plate to form said plate offset section such that a uniform gap is created between said plate offset section and the back of the first frame leg, said plate offset section having attachment holes positioned therethrough proximate said second edge; and c) an elongated rectangular bar having a thickness corresponding to said uniform gap, one or more connecting holes formed therethrough and adapted to be positioned within said uniform gap in contact with the back of the first frame leg;

d) one or more fasteners extending through said attachment holes of the plate offset section and said connecting holes of said rectangular bar to releasably affix said reinforcement plate and said rectangular bar to the back of the first frame leg.

13. A pre-hung door assembly comprising the reinforced door frame assembly of claim 8 and a door mounted on hinges thereto a second frame leg of the door frame with two frame legs.

14. A method of installing an entry door frame reinforcement assembly on a back of a door frame leg having a lock/latch bore, the method comprising steps of:

a) providing a reinforcement plate having a first edge and a second edge, said reinforcement plate having a lock/latch opening formed therethrough and positioned proximate said first edge, a plate offset section proximate said second edge of said reinforcement plate, said plate offset configured of two spaced apart opposing bends therein said reinforcement plate to form said plate offset section such that a uniform gap is created between said plate offset section and the back of the door frame leg, said plate offset section having attachment holes positioned therethrough proximate said second edge, an elongated rectangular bar having a thickness corresponding to said uniform gap, one or more connecting holes formed therethrough and adapted to be positioned within said uniform gap in contact with the back of the door frame leg, one or more fasteners extending through said attachment holes of the plate offset section and said connecting holes of said rectangular bar to releasably affix said reinforcement plate and said rectangular bar to the back of the door frame leg, a support flange positioned therein said lock/latch opening and proximate said first edge, said support flange extends perpendicular to said reinforcement plate, and is adapted to extend therein the lock/latch bore;

b) positioning said reinforcement plate and said elongated bar against the back of the door frame leg with said lock/latch opening adjacent the lock/latch bore in the door frame leg;

c) ensuring that said support flange extends perpendicular into a portion of the lock/latch bore; and d) installing one or more fasteners through said attachment holes and said connecting holes and further extends therein the door frame to secure reinforcement plate thereto the back of the door frame leg.

15. The method of claim 14, further comprising steps of providing at least one slotted hole positioned between said lock/latch opening and said two spaced apart opposing bends of said reinforcement plate, to reinforce said reinforcement plate in contact with the door frame leg.

16. The method of claim 15, further comprising steps of inserting one or more fasteners therethrough at least one slotted hole and further therein the back of the door frame leg.

17. The entry door frame reinforcement assembly of claim 1, wherein said elongated rectangular bar has a thickness corresponding to said uniform gap of approximately $1/32$-$1/8$ inches.

18. The entry door frame reinforcement assembly of claim 1, wherein said reinforcement plate is fabricated from at least 14-gage thick galvanized sheet steel.

* * * * *